(12) United States Patent
Mohan

(10) Patent No.: US 9,526,147 B2
(45) Date of Patent: *Dec. 20, 2016

(54) USER CONTROL OF AN ENVIRONMENTAL PARAMETER OF A STRUCTURE

(71) Applicant: enLighted, Inc., Sunnyvale, CA (US)

(72) Inventor: Tanuj Mohan, Mountain View, CA (US)

(73) Assignee: enLighted, Inc., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/075,121

(22) Filed: Mar. 19, 2016

(65) Prior Publication Data

US 2016/0205751 A1    Jul. 14, 2016

Related U.S. Application Data

(60) Division of application No. 14/138,017, filed on Dec. 21, 2013, now Pat. No. 9,326,354, which is a continuation-in-part of application No. 13/533,504, filed on Jun. 26, 2012, now Pat. No. 9,226,371.

(51) Int. Cl.
| | |
|---|---|
| H05B 37/02 | (2006.01) |
| H05B 39/04 | (2006.01) |
| H05B 41/36 | (2006.01) |

(52) U.S. Cl.
CPC .......... *H05B 37/02* (2013.01); *H05B 37/0245* (2013.01); *H05B 37/0254* (2013.01); *H05B 37/0272* (2013.01); *H05B 37/0227* (2013.01)

(58) Field of Classification Search
CPC .................................................. H05B 37/0272

USPC .......................................................... 315/152
See application file for complete search history.

(56) References Cited

U.S. PATENT DOCUMENTS

| | | |
|---|---|---|
| 5,101,141 A | 3/1992 | Warner et al. |
| 5,179,324 A | 1/1993 | Audbert |
| 5,191,265 A | 3/1993 | D'Aleo et al. |
| 5,283,516 A | 2/1994 | Lohoff |
| 5,812,422 A | 9/1998 | Lyons |
| 6,057,654 A | 5/2000 | Cousy et al. |
| 6,188,181 B1 | 2/2001 | Sinha et al. |
| 6,342,994 B1 | 1/2002 | Cousy et al. |
| 6,548,967 B1 | 4/2003 | Dowling et al. |
| 7,309,985 B2 | 12/2007 | Eggers et al. |
| 7,348,736 B2 | 3/2008 | Piepgras et al. |
| 7,382,271 B2 | 6/2008 | McFarland |
| 7,437,596 B2 | 10/2008 | McFarland |
| 7,550,931 B2 | 6/2009 | Lys et al. |
| 7,566,137 B2 | 7/2009 | Veskovic |

(Continued)

*Primary Examiner* — Lincoln Donovan
*Assistant Examiner* — Metasebia Retebo
(74) *Attorney, Agent, or Firm* — Brian R. Short

(57) ABSTRACT

An apparatuses, methods and systems for providing user control of an environmental parameter of a structure are disclosed. One method includes configuring one or more sensor units of the lighting system, establishing a local communication link between a user device and at least one sensor unit of the one or more sensor units, receiving, by the at least one sensor unit, a request from the user device, the at least one sensor unit propagating the request to a controller of the lighting system, the controller responding to the request with an operational change of a device associated with the at least one sensor unit, and the at least one sensor unit or the device associated with the at least one sensor unit providing an observable indicator to the user that the request has been addressed.

18 Claims, 11 Drawing Sheets

(56) References Cited

U.S. PATENT DOCUMENTS

| | | |
|---|---|---|
| 7,623,042 B2 | 11/2009 | Huizenga |
| 7,792,956 B2 | 9/2010 | Choong et al. |
| 7,925,384 B2 | 4/2011 | Huizenga et al. |
| 8,558,466 B2 | 10/2013 | Curasi et al. |
| 2004/0002792 A1 | 1/2004 | Hoffknecht |
| 2005/0169643 A1 | 8/2005 | Franklin et al. |
| 2006/0275040 A1 | 12/2006 | Franklin |
| 2007/0057807 A1 | 3/2007 | Walters et al. |
| 2007/0061050 A1 | 3/2007 | Hoffknecht |
| 2007/0086128 A1 | 4/2007 | Lane et al. |
| 2007/0215794 A1 | 9/2007 | Cernasov et al. |
| 2008/0185977 A1 | 8/2008 | Veskovic et al. |
| 2008/0244104 A1 | 10/2008 | Clemente |
| 2008/0265796 A1 | 10/2008 | Null |
| 2009/0026966 A1 | 1/2009 | Budde et al. |
| 2009/0179596 A1 | 7/2009 | Willaert et al. |
| 2009/0195161 A1 | 8/2009 | Lane et al. |
| 2009/0278479 A1 | 11/2009 | Platner et al. |
| 2010/0034386 A1 | 2/2010 | Choong et al. |
| 2010/0135186 A1 | 6/2010 | Choong et al. |
| 2010/0264846 A1 | 10/2010 | Chemel et al. |
| 2010/0270933 A1 | 10/2010 | Chemel et al. |
| 2010/0295482 A1 | 11/2010 | Chemel et al. |
| 2010/0301777 A1 | 12/2010 | Kraemer |
| 2011/0031897 A1 | 2/2011 | Henig et al. |
| 2011/0199020 A1 | 8/2011 | Henig et al. | ously
USER CONTROL OF AN ENVIRONMENTAL PARAMETER OF A STRUCTURE

RELATED APPLICATION

This patent application is a Divisional patent application U.S. patent application Ser. No. 14/138,017 filed Dec. 21, 2013, which is a continuation-in-part of U.S. patent application Ser. No. 13/533,504 filed Jun. 26, 2012, granted as U.S. Pat. No. 9,226,371 on Dec. 29, 2015, which are herein incorporated by reference.

FIELD OF THE EMBODIMENTS

The described embodiments relate generally to building environmental control. More particularly, the described embodiments relate to user control of an environmental parameter of a structure.

BACKGROUND

Lighting control systems automate the operation of lighting within a building or residence based upon, for example, preset time schedules and/or occupancy and/or daylight sensing. The Lighting systems typically employ occupancy sensors and/or daylight sensors to determine which lighting devices to activate, deactivate, or adjust the light level of, and when to do so. Occupancy sensors typically sense the presence of one or more persons within a defined area and generate signals indicative of that presence. Daylight sensors typically sense the amount of daylight present within a defined area and generate signals indicative of that amount. Typically, lighting systems receive the sensor signals at a central lighting controller.

The lighting systems are advantageous because they typically reduce energy costs by automatically lowering light levels or turning off devices and appliances when not needed, and they can allow all devices in the system to be controlled from one location.

The above-described lighting systems, however, do not provide specific user control over the lighting devices. Generally, user control of lighting within buildings is limited to physically installed switches. Implementing the user control without physical switches, that is with logical switches that are implemented in software, is difficult because it is a nightmare to associate occupant users with specific lights or lighting fixtures in a logical fashion (that is, on, for example, a web browser or a mobile device). It is very difficult to provide a logical switch (in software) that can determine that the user is physical proximate to one of the lights or light fixtures, and to also authorize the user to have control over the light or light fixture.

It is desirable to have a method, system and apparatus for user control of an environmental parameter of a structure.

SUMMARY

One embodiment includes a method of a lighting system providing user control of a structure. The method includes configuring one or more sensor units of the lighting system, establishing a local communication link between a user device and at least one sensor unit of the one or more sensor units, receiving, by the at least one sensor unit, a request from the user device through the local communication link, and responding, by the at least one sensor unit, to the request by transmitting over a second link, an RF (radio frequency) self-identification signal, wherein the RF self-identification signal provides the user device with a display of control options. The method further includes receiving, by the user device, select control options from a user of the user device based on the display of control options, transmitting, by the user device, an RF control signal that includes the select control options to the at least one sensor unit, the at least one sensor unit propagating the select control options to one or more controllers of the lighting system, the one or more controllers responding to the select control options with an operational change of a device associated with the at least one sensor unit, and the at least one sensor unit or the device associated with the at least one sensor unit providing an observable indicator to the user that the select control options have been addressed.

Another embodiment includes a system that provides user control of lighting of a structure. The system includes a lighting fixture and one or more controllers. The lighting fixture is operative to establish a local communication link between a user device and the lighting fixture, wherein the lighting fixture is located within the structure. The one or more controllers are operative to configure one or more sensor units of the lighting system, wherein at least one sensor unit of the one or more sensor units is associated with the lighting fixture, wherein the at least one sensor unit is operative to receive a request from the user device, respond to the request by transmitting over a second link, an RF (radio frequency) self-identification signal, wherein the RF self-identification signal provides the user device with a display of control options, receive an RF control signal that includes select control options from the user device, wherein the select control options were input to the user device by a user on the display of control options, and propagate the select control options to the one or more controllers, wherein the one or more controllers is further operative to respond to the select control options with an operational change of the lighting fixture associated with the at least one sensor unit, and wherein the at least one sensor unit or the fixture associated with the at least one sensor unit is operative to provide an observable indicator to the user that the select control options have been addressed.

Another embodiment includes an intelligent lighting fixture. The intelligent lighting fixture includes a light, a sensor unit and a controller. The controller or an external controller that is linked to the controller, is operative to configure one or more sensor units of the lighting system, wherein at least one of the one or more sensor units includes the sensor unit, wherein the sensor unit is operative to receive a request from the user device, respond to the request by transmitting over a second link, an RF (radio frequency) self-identification signal, wherein the RF self-identification signal provides the user device with a display of control options, receive an RF control signal that includes select control options from the user device, wherein the select control options were input to the user device by a user on the display of control options, and propagate the select control options to the controller or the external controller, wherein the controller or the external controller is further operative to respond to the select control options with an operational change of the lighting fixture associated with the sensor unit, and wherein the sensor unit or the fixture associated with the sensor unit is operative to provide an observable indicator to the user that select control options have been addressed.

Other aspects and advantages of the described embodiments will become apparent from the following detailed description, taken in conjunction with the accompanying drawings, illustrating by way of example the principles of the described embodiments.

DETAILED DESCRIPTION

Figure 1:
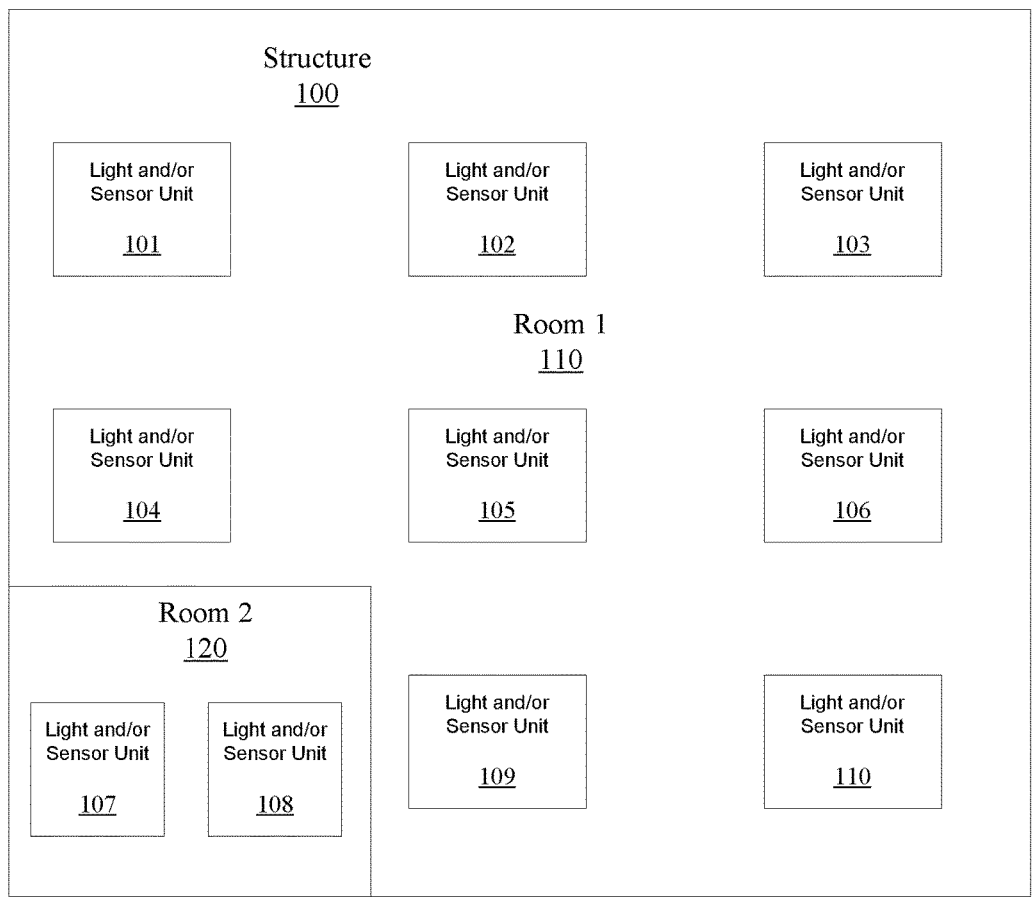
FIG. 1 shows a structure that includes a plurality of sensors in which the described embodiments can be utilized, according to an embodiment.

As shown in the drawings, the described embodiments are embodied in an apparatuses, methods, and systems for providing user control of an environmental parameter of a structure, according to an embodiment.

At least some of the disclosed embodiments include two steps in setting up control. The first step includes binding or associating the user control (e.g. remote switch) with the environmental fixture (e.g. light fixture). For at least some embodiment, strobing the fixture is used to determine physical binding. However, other embodiment include, for example, looking up an electronic calendar or user schedule, to establish or determine binding. For example, based on a user's electronic schedule, binding with, for example, a fixture within a conference room or any other room, is established by the user's electronic schedule indicating the presence of the user. The second step includes authorizing the user. That is, the user is authorized to control the environmental parameter associated with the fixture (such as, lighting). Authorization can occur at many levels. For example, authorization can be established based on, for example, physical presence of the user, or through a login procedure using electronic management or an active directory.

FIG. 1 shows a system that provides user control of an environmental parameter of a structure 100, according to an embodiment. The structure 100 includes lighting/sensor units 101-110. For an embodiment, a sensor unit is associated with a lighting unit. For another embodiment, sensor units operate autonomously or independently. For an embodiment, the sensor units detect or sense occupancy, and control an environmental condition of the structure 100. For an embodiment, the environmental condition includes lighting. For an embodiment, the environmental control includes temperature.

For an embodiment, the plurality of sensor units 101-110 of the lighting system are configured. For an embodiment, configuring the sensor units includes commanding the sensor unit to respond to stimulus or signals received from a user device. For an embodiment, the user device includes a mobile device, such as, a smart phone or other hand-held computing device.

For an embodiment, configuring the sensor includes commanding the sensor how to respond based upon a stimulus or signals received from the user device. For example, for a lighting system, configuring the sensor includes the sensor controlling a light intensity of an associated light. That is, for an embodiment, the sensor is associated with a lighting device, and depending on how the sensor is configured, the sensor controls the light to operate based on a stimulus or signals received from the user device.

FIG. 1 includes a Room1 110 and a Room2 120 located within the structure 100. Further, light/sensor units 107, 108 are located within the Room2 120. This illustrates that the sensor units can be grouped according to, for example, rooms, and provide user device control over the environmental conditions of each of the rooms 110, 120 independently.

Figure 2:
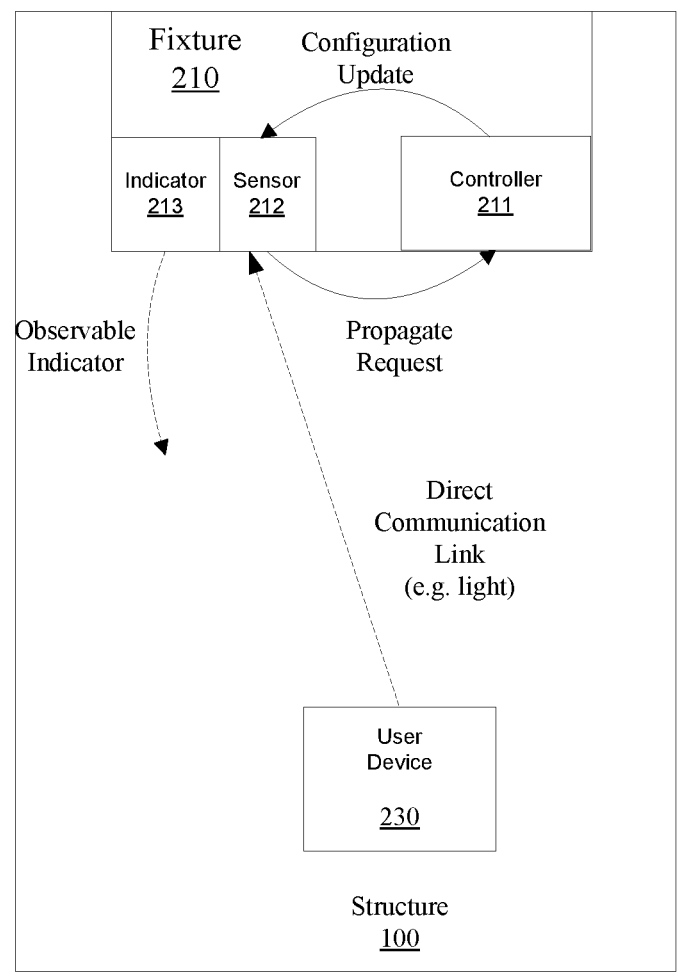
FIG. 2 shows a system that provides user control of an environmental parameter of a structure, according to an embodiment.

FIG. 2 shows a system that provides user control of an environmental parameter of a structure, according to another embodiment. A fixture 210 includes a sensor 212 and a controller 211. For an embodiment, the fixture includes a sensor and a light. For an embodiment, the sensor includes a light sensor. For an embodiment, the sensor includes a radio frequency (RF) transceiver. For an embodiment, the sensor includes a motion sensor.

For an embodiment, a local line-of-sight communication link is established between a user device 230 and the sensor 212. Through the line-of-sight communication link, and the sensor 212 receives a request from the user device 230. The sensor 212 propagates the request to a controller 211 of the lighting system. For this embodiment, the controller 211 is included within the fixture 210.

For an embodiment, the controller 211 responds to the request with an operational change of a device (such as a light) associated with the sensor 212. For example, based on the request, the controller 211 adjusts or sets an intensity of light associated with the sensor 212. That is, for an embodiment, the fixture 210 further includes a light or lights that provide light to the structure 100, and based on the request, the controller adjusts the intensity of the light. Further, for an embodiment, the controller 211 and/or sensor 212 are associated with a plurality of lights of a lighting group, and the controller 211 adjusts characteristics of the light emitted from the lighting group based on the request from the sensor 212.

For an embodiment, when the controller 211 provides the configuration update of the sensor/light of the fixture, an indicator 213 provides an observable indication to the user of the user device 230 that the request has been received, and that the request has be addressed. For an embodiment, the observable feedback includes a visible indicator that includes, for example, control of a light. The control can be in the form of a flashing light, a light turning on or off, and/or adjustment in the intensity of the light. For an embodiment, the observable indicator includes an audible indicator, such as, a beep or other type of sound.

Figure 3:
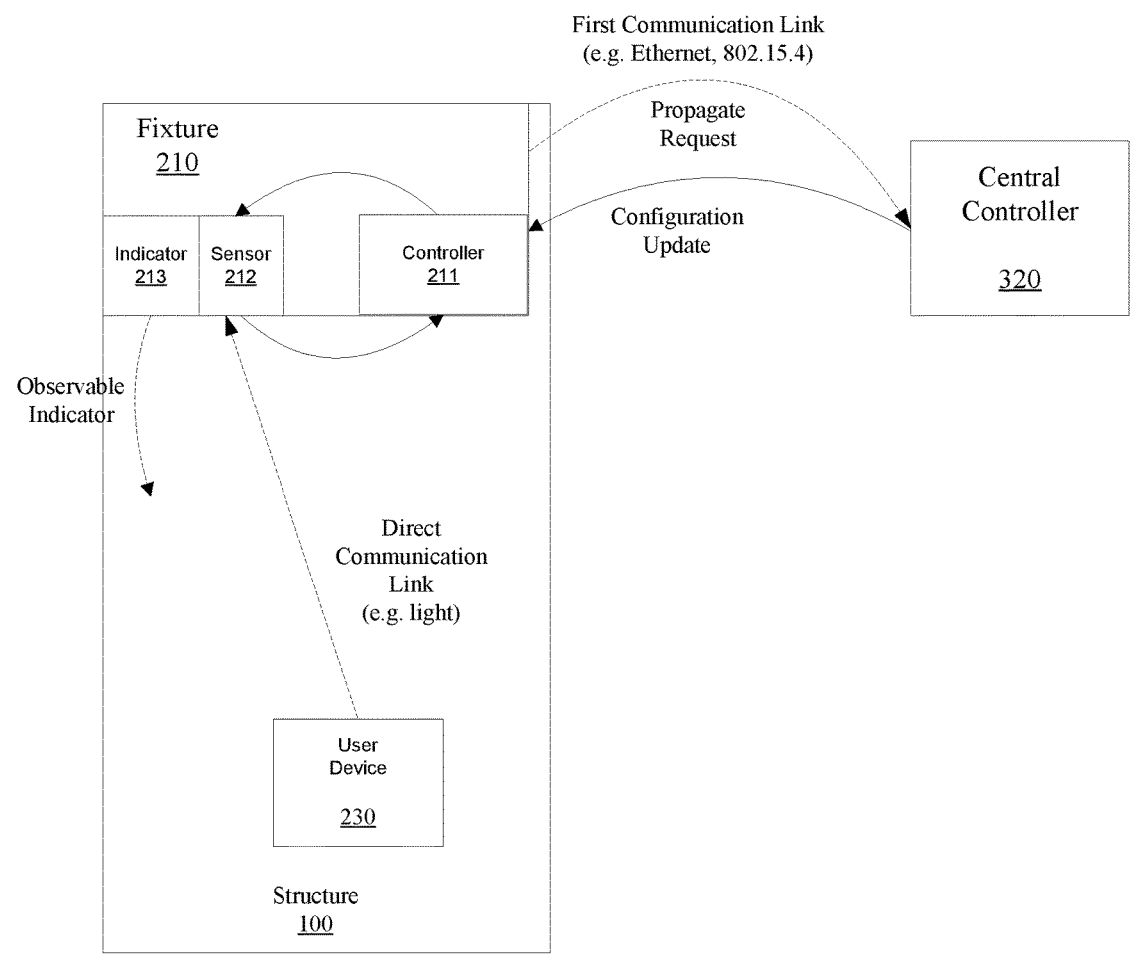
FIG. 3 shows a system that provides user control of an environmental parameter of a structure, according to another embodiment.

FIG. 3 shows a system that provides user control of an environmental parameter of a structure 100, according to another embodiment. This embodiment includes a separate central controller 320. As shown, the request received by the sensor 212 from the user device 230 is propagated through the controller 211 of the fixture to the central controller 320. The propagation occurs through a wired link (such as, an Ethernet interface) or through a wireless interface (such as, an 802.11 wireless interface). The central controller 320 provides the configuration update in response to the propagated request.

Figure 4:
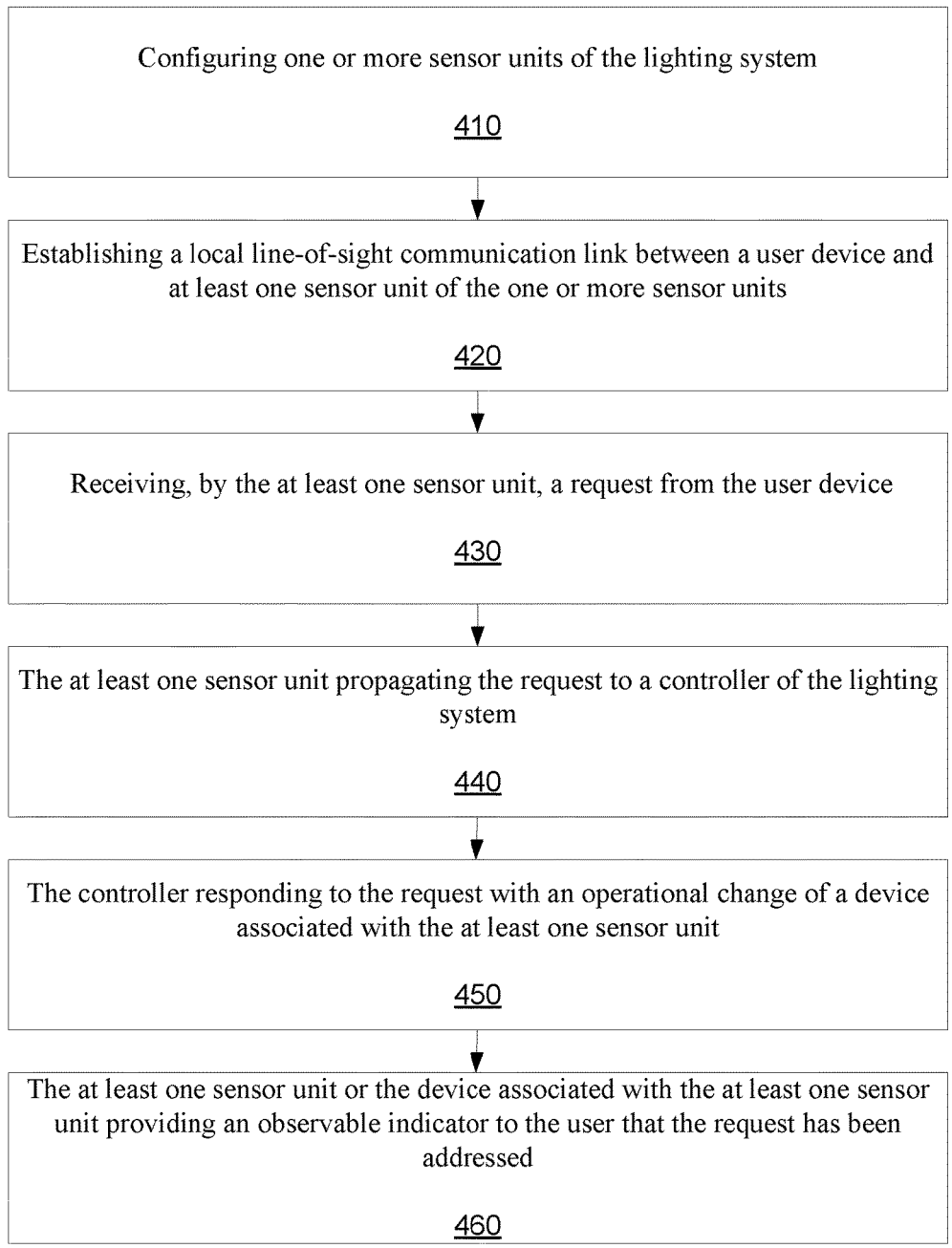
FIG. 4 is a flow chart that includes the steps of a method providing user control of an environmental parameter of a structure, according to an embodiment.

FIG. 4 is a flow chart that includes the steps of a method providing user control of an environmental parameter of a structure, according to an embodiment. A first step 410 includes configuring one or more sensor units of the lighting system. A second step 420 includes establishing a local line-of-sight communication link between a user device and at least one sensor unit of the one or more sensor units. A third step 430 includes receiving, by the at least one sensor unit, a request from the user device. A fourth step 440 includes the at least one sensor unit propagating the request to a controller of the lighting system. A fifth step 450 includes the controller responding to the request with an operational change of a device associated with the sensor unit. A sixth step 460 includes the sensor unit or the device associated with the sensor unit providing an observable indicator to the user that the request has been addressed.

For an embodiment, configuring the one or more sensor units of the lighting system includes setting an identification (ID) characteristic of communication through communication link between the user device and the sensor unit in which the sensor unit responds. For an embodiment, the ID characteristic requires communication received by the sensor units to be encoded correctly such that the sensor respond to the communication. That is, the communication is secured by requiring received communication to be properly coded. For an embodiment, setting the ID characteristics includes setting or defining a predetermined set of light pulses within the communication which cause the sensor unit to respond to the communication.

For an embodiment, configuring the one or more units of the lighting system further comprises defining operational changes of the device associated with the sensor unit, and characteristics of the communication that correspond with the operational changes.

For an embodiment, the request includes at least one of a lighting level request, an environmental control request.

For an embodiment, the at least one sensor unit propagating the request to a controller includes the at least one sensor unit communicating the request to the controller through one or more communication links. For an embodiment, the one or more communication links comprises a plurality of wireless links between the at least one sensor unit and at least one other sensor unit.

Owing to the configurations of the described embodiment, the user device does not have to login or be authenticated by the controller of the lighting system. That is, the user device gains access to the control system by properly accessing the sensor. The sensor then communicate with the backend server (central controller), thereby allowing the user device to access the backend server within being directly authenticated by the backend server. For an embodiment, the user device accesses the controller through the aid of a downloaded application. That is, the user device downloads an application that allows the user device to properly gain communication with the backend server through one or more of the sensors. For an embodiment, user device uploads personal preferences to the controller through the second communication link.

Figure 5:
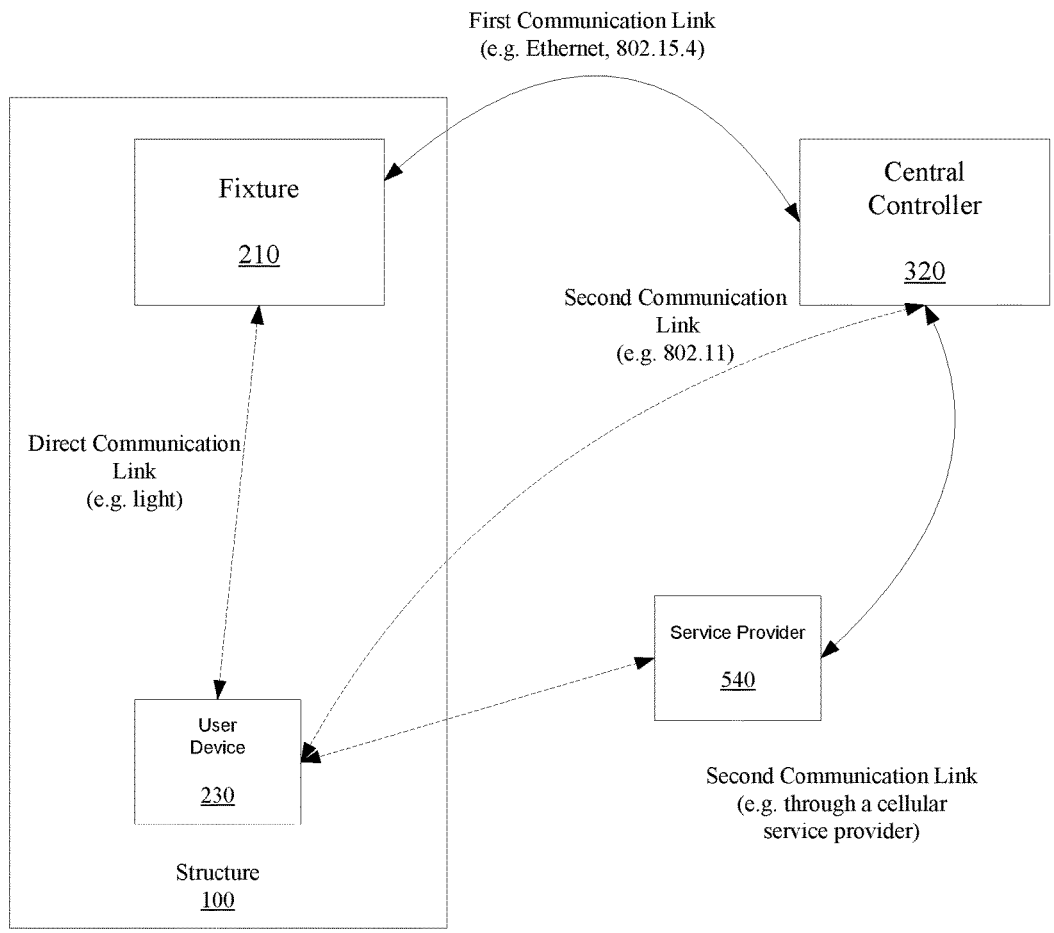
FIG. 5 shows a system that provides user control of an environmental parameter of a structure, according to another embodiment.

FIG. 5 shows a system that provides user control of an environmental parameter of a structure, according to an embodiment. The fixture 210 is located within a structure 100. The structure can be a building, parking structure or any other structure that one may want to control lighting, temperature, humidity, security or other environment parameters.

As shown, the user device 230 typically located within the structure, can control one or more of the environmental parameters. The user device 230 can be any type of computing device that includes a controller and a communication interface. The user device 230 establishes communication with the fixture 210, through, for example, a direct communication link. The link is typically a line-of-sight link, and can be established by the user device pulsing a light signal which a light sensor of the fixture 110 sensed. For example, this strobing can be done using the camera flash on a mobile device (e.g. cell-phone). This direct link, however, can be established through any type of stimulus. For example, the direct link can be established through motion of a user of the user device 130 that the fixture sensed. Alternatively or additionally, the direct link can include any type of wireless communication. For an embodiment, the direct link between the user device 230 merely establishes communication between the user device 230 and the fixture 210 so that each is aware of the other. For another embodiment, the direct link between the user device 210 and the fixture 210 provides a means for communicating from the user device 230 to the fixture 210, or communication between (back and forth) the user device 230 and the fixture 210.

Upon establishing the direct link between the user device 230 and the fixture 210, the fixture establishes a first communication link to the central controller 320. The fixture 210 indicates to the controller 220 that a direct connection has been established between the fixture 210 and the user device 230. The first communication link can include one or more communication links. That is, the first communication link can include multiple hops of communication links (wired and/or wireless).

Further, for an embodiment, the user device 230 establishes a second communication link to the central controller 320. Generally, the user device 230 communicates control information to the central controller 320 through the second communication link. For example, if the fixture 210 controls lighting of a conference room in which both the fixture 210 and the user device 230 are located, the control information can includes lighting and/or temperature requests of the user of the user device 230. The central controller 320 can then honor the request of the user by appropriately controlling the fixture 210 through the first communications link.

Two examples of the second communication link are shown. A first includes a direct link through the user device 230 and the central controller. This could be implemented, for example, by a WiFi (802.11) connection between the user device 230 and the central controller 320. The second communication link could alternatively be implemented through a cellular service provider 540. That is, the user device can establish a wireless connection with a cell tower of a cellular service provider 540. The service provider can then provide a connection to the central controller 320.

As shown and described, the central controller 320 does not have to know exactly where the user device 230 is located. The direct communication link between the user device 230 and the fixture 210 indicates that the user device 230 is proximate to the fixture 210, and that the user of the user device is trying to control a parameter of the fixture 110.

The direct communication link can be a very simple link because the control information of the user device is being delivered to the central controller 220 through an alternate (the second) communication link.

Figure 6:
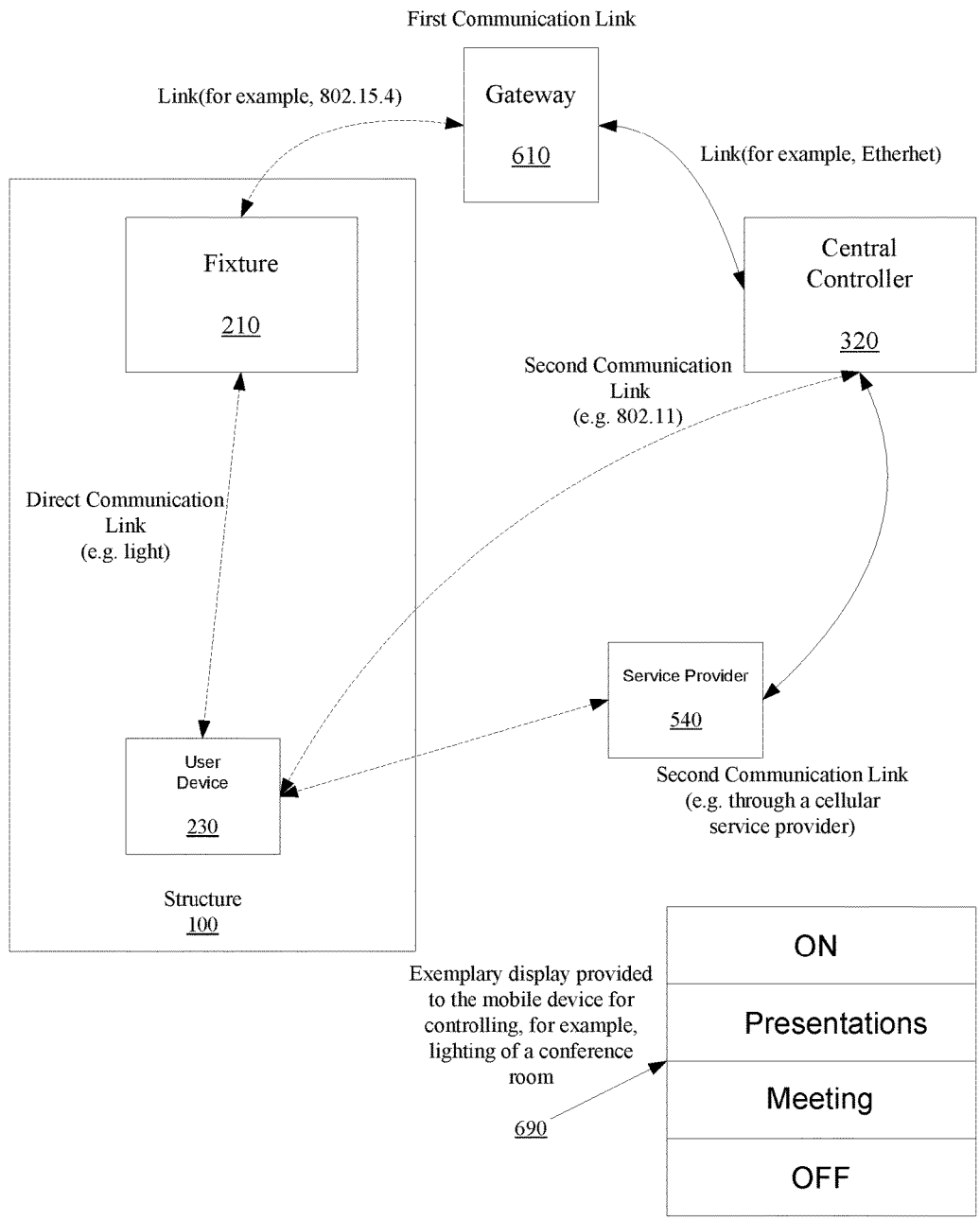
FIG. 6 shows a system that provides user control of an environmental parameter of a structure, according to another embodiment.

FIG. 6 shows a system that provides user control of an environmental parameter of a structure, according to another embodiment. This embodiment further includes a gateway 610. An embodiment of the gateway 610 manages the connections, interfaces and controls of multiple fixtures.

As shown, the first communication link is established between the fixture 210 and the central controller 320 through a link (for example, a Zigbee® 802.15.4 wireless link) between the fixture 210 and the gateway 610, and a link (for example, an Ethernet® wired link) between the gateway 610 and the central controller 320.

Additionally, as shown, upon the central controller 320 receiving a control request from the user device 230, an embodiment includes the central controller providing the user device 230 with a display that includes, for example, various control parameter information. As shown, one example includes a display 690 as shown on a screen of the user device 230 that provides the user of the user device 230 various control information and selections. The example shown includes a display that provides light on and off control, a presentations selection that indicates that the user is presenting within a conference room of the fixture 210, and that the conference room lighting is to be selected to be suitable for such presentations, a meeting selection that indicates the user is indicating that the conference room is to be used for a meeting, and that the lighting of the conference room needs to be appropriately set.

Figure 7:
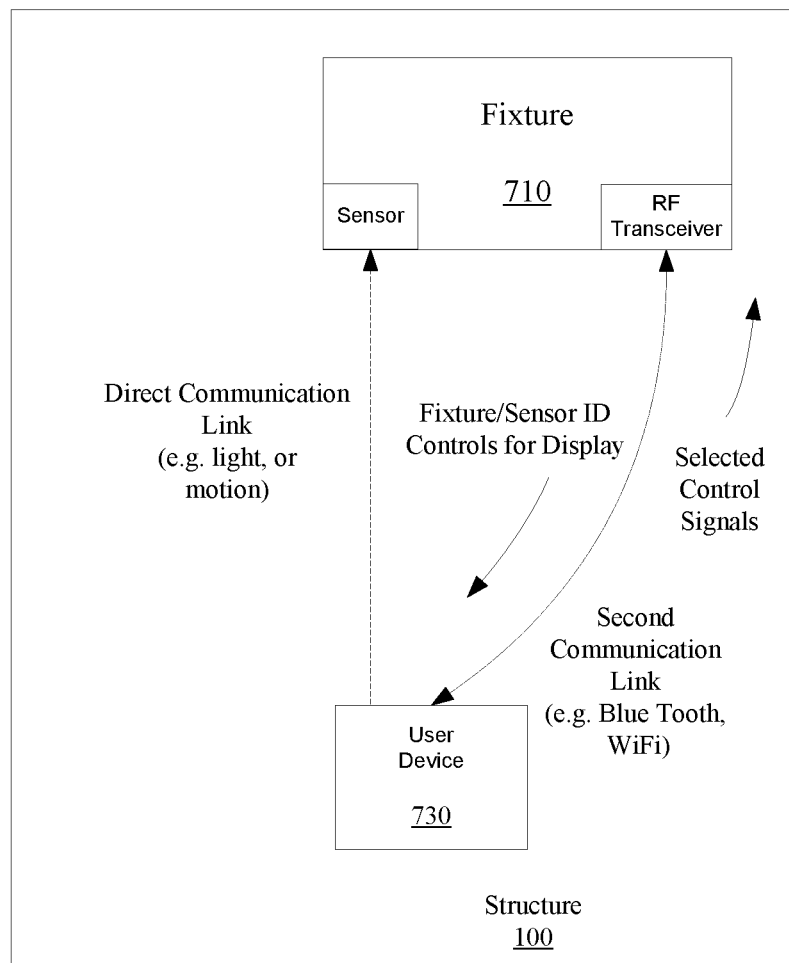
FIG. 7 shows a system that provides user control of an environmental parameter of a structure, according to another embodiment.

FIG. 7 shows a system that provides user control of an environmental parameter of a structure 100, according to another embodiment. For this embodiment, the user device 730 establishes a direct communication link between the user device 730 and a fixture 710 located within the structure 100. The fixture 710 then identifies itself to the user device 730 through a first communication link to the user device 730 by sending a broadcasts/multicast message. The user device 730 then uses this identification to send control information to the fixture 710 using the first communication link. By learning the fixture address from the broadcast/multicast message the user device 730 is able to send a unicast message to control the fixture 710. The direct link is different than the first communication link.

For an embodiment, the sensor unit of the fixture 710 is configured. Further, user control includes establishing a local communication link between the user device 730 and the sensor unit of the fixture 710. For at least some embodiments, the local communication link includes a sequence or strobes of light, and/or sequences of motion. Further, the mobile device 730 includes a wireless RF (radio frequency) link transceiver, such as, blue tooth or WiFi transceiver. After the sensor unit has received and been stimulated by the local communication (first communication link), the sensor unit and/or the fixture 710 of the sensor unit responds with a self-identification RF signal (through a second communication link) that identifies the sensor unit and/or the fixture 710. Once the mobile device 730 has established the local communication link (first communications link), the mobile device 730 listens and receives the self-identification RF signal (second communications link), which additionally includes control options to be displayed on the mobile device 730. The user of the mobile device 730 then controls the sensor unit and/or the fixture 730 through selectable controls provided by the control options on the display of the mobile device 730. The selectable controls are communicated to the sensor and/or the fixture through RF signals (through the second communications link). That is, the sensor unit and/or fixture 710 receive the request from the user device and the sensor unit propagates the request to a controller of the lighting system. The controller responds to the request with an operational change of a device associated with the at least one sensor unit. Further, the sensor unit or the device associated with the at least one sensor unit responds to the request with an RF (radio frequency) self-identification signal, wherein the RF self-identification signal provides the user device with a display of control options which when selected, transmit another RF control signal back to the at least one sensor unit, for controlling the sensor and/or the fixture 710.

Figure 8:
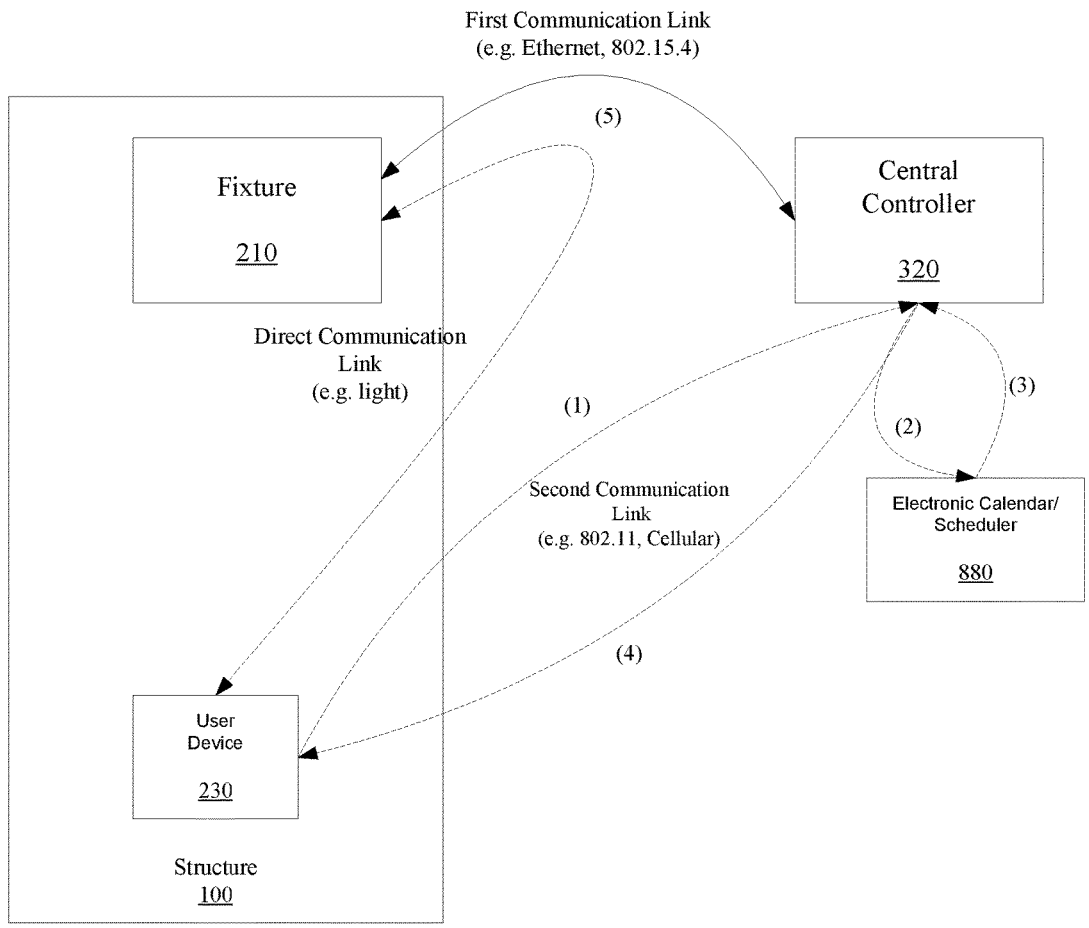
FIG. 8 shows a system that provides user control of an environmental parameter of a structure, according to another embodiment.

FIG. 8 shows a system that provides user control of an environmental parameter of a structure 100, according to another embodiment. A sequence of operation is labeled (1) through (6) for an example of an implementation of this embodiment. A first step (1) includes a user device 230 requesting control of one or more fixtures (such as fixture 210) located within the structure 100. A second step (2) includes a central controller 320 (backend server) receiving the user request (through a second link that is, for example, a cellular or WiFi connection). A third step (3) includes the central controller 320 accessing an electronic calendar 880 (located at the central controller or remotely) to locate the fixture 210 according to the electronic calendar 880. A fourth step (4) includes the central controller 320 providing the user device 230 with control information associated with the fixture 210. This includes, for example, on/off, dim or preset scenes for an individual or group of fixtures. A fifth step (5) includes the user device 230 selecting a control option (for example, on/off etc.) for the fixture 210, and communicating this back to selected fixture 210. The communication back to the fixture 210 can be a direct communication link (for example Bluetooth, WiFi etc.), or the communication link can be back through the central controller 320 (through, for example, the second link) and then back to the fixture 210 (through, for example, the first link). For an embodiment, the electronic calendar 880 is a database that includes a scheduler/calendar of users and locations (rooms) and times in which the users are authorized to have control over one or more fixtures associated with a particular room or location within the structure.

Figure 9:
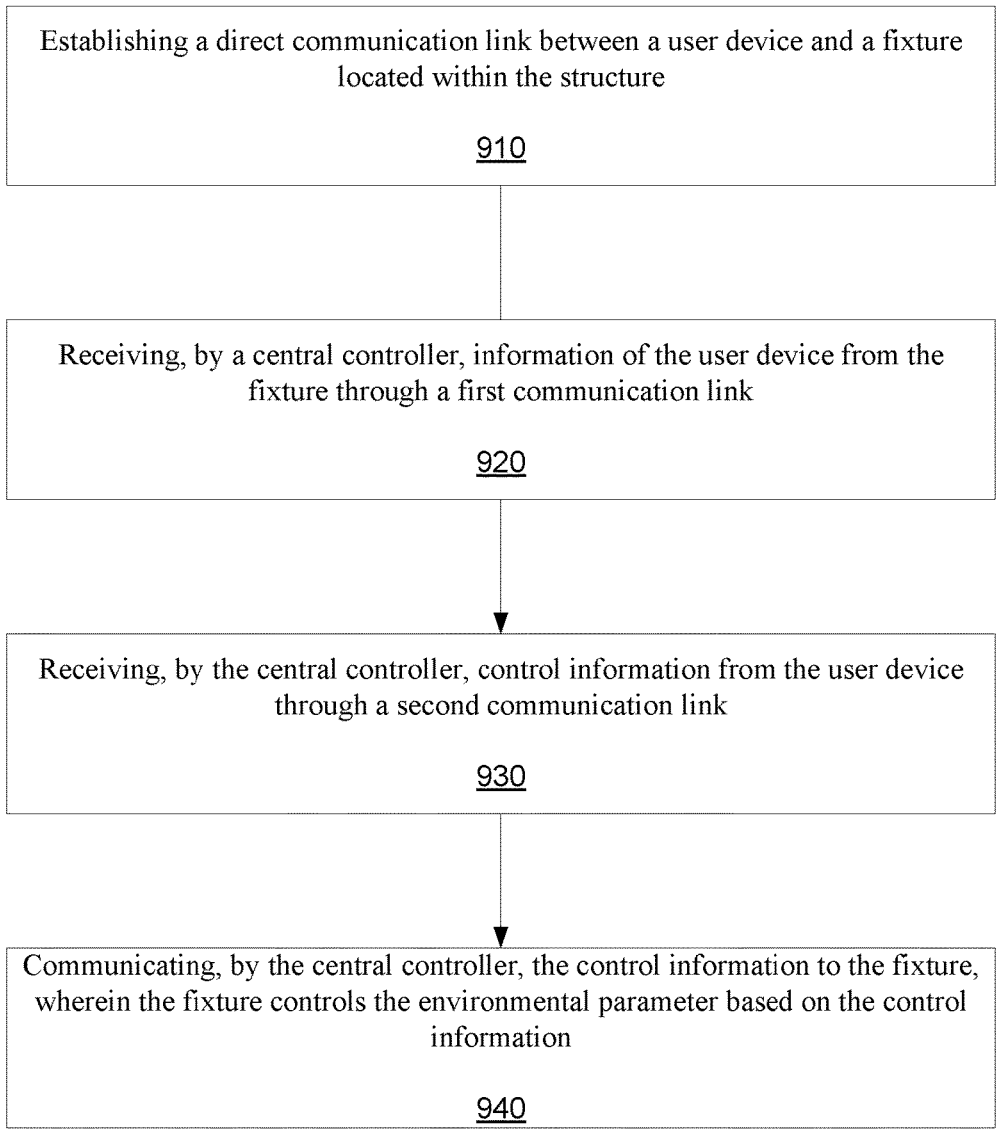
FIG. 9 is a flow chart that includes the steps of a method providing user control of an environmental parameter of a structure, according to another embodiment.

FIG. 9 is a flow chart that includes the steps of a method of providing user control of an environmental parameter of a structure. A first step 910 includes establishing a direct communication link between a user device and a fixture located within the structure. A second step 920 includes receiving, by a central controller, information of the user device from the fixture through a first communication link. A third step 930 includes receiving, by the central controller, control information from the user device through a second communication link. A fourth step 940 includes communicating, by the central controller, the control information to the fixture, wherein the fixture controls the environmental parameter based on the control information.

For an embodiment, the central controller associates the user device with the fixture by correlating the receiving of information from the fixture through the first communication link with the receiving of the control information from the user device through the second communication link. For an embodiment, the correlation includes a timing correlation. That is, the central controller receives the information of the user through the first communication link within, for example, a time window of when the central controller receives the control information through the second communication link. An alternative embodiment includes the central controller receive some sort of identifier information of the user device through the first communication link, and therefore, does not have to correlate the timing of the first link communication and the second link communication.

It is possible that the central controller receives first and second communication link information within a small time window. For example, a large building may include many fixtures and many occupants. Therefore, multiple occupants may be requesting control over multiple fixtures. Accordingly, for an embodiment, if the central controller correlates information received from more than one fixture with the user device, then the controller provides the user device with a selection. That is, the correlation may end up associating two separate fixtures with a single user. It this situation, the central controller communicates back to the user device over the second communications link a selection between multiple possible fixtures. The user can then select the fixture that the user desires control. For another embodiment, if the central controller correlates information received from more than one fixture with the user device, then the central controller communicates this (that is, that more than one fixture has been correlated to) to the user device, allowing the user device to re-establishing the direct communication link between the user device and the fixture located within the structure, whereby the central controller again receives of the information of the user device from the fixture through the first communication link, thereby uniquely associating the user device with the fixture.

For an embodiment, establishing the direct communication link includes a sensor of the fixture receiving a stimulus directly from the user device. For an embodiment, the sensor is an ambient light sensor. For another embodiment, the sensor is a motion sensor. It is to be understood that alternate sensor can additionally or alternatively be used.

For an embodiment, the direct communication link includes a line-of-sight link between the user device and the fixture. Typically, the line-of-sight link establishes that the user and the user device are in fact proximate to the fixture. For an embodiment, the stimulus comprises emitted light. For an embodiment, the stimulus includes information allowing identification of the user device that emitted the stimulus.

For an embodiment, the user device completes a log-in procedure with the central controller. That is, for example, the user device can log-in with the central controller upon entering a building or structure that includes many of the described fixtures. Logging in with the central controller can be desirable, and provide for a better user-experience. For example, by previously logging in, a request for control by the user device can be honored much more quickly as the setup time for a connection (up to a couple of seconds for a secure wireless connection) can be been eliminated.

For an embodiment, the fixture is a member of a logical group of fixtures, and the central controller provides control of a plurality of fixtures within the logical group as determined by the control information received from the user device. For an each of the building fixtures of the logical group are operative to receive an input from a device, wherein the building fixture responds to the input if the input includes an identifier associating the input with the logical group. For this embodiment an external controller can interface with particular logical groups based on the unique identifier associated with the logical group. Associating the unique identifiers with logical groups provides for ease of scaling of the number of building fixtures. That is, for example, conventional centrally-controlled systems require either more messages or larger messages to control building fixtures, whereas including unique identifiers with logical groups provides for an efficient system in which the transmitted data doesn't grow or increase as the group grows. Additionally, the system is less reliant on and requires less use of any one communication channel, and therefore, the likelihood of failure due to communication channel use is less.

Figure 10:
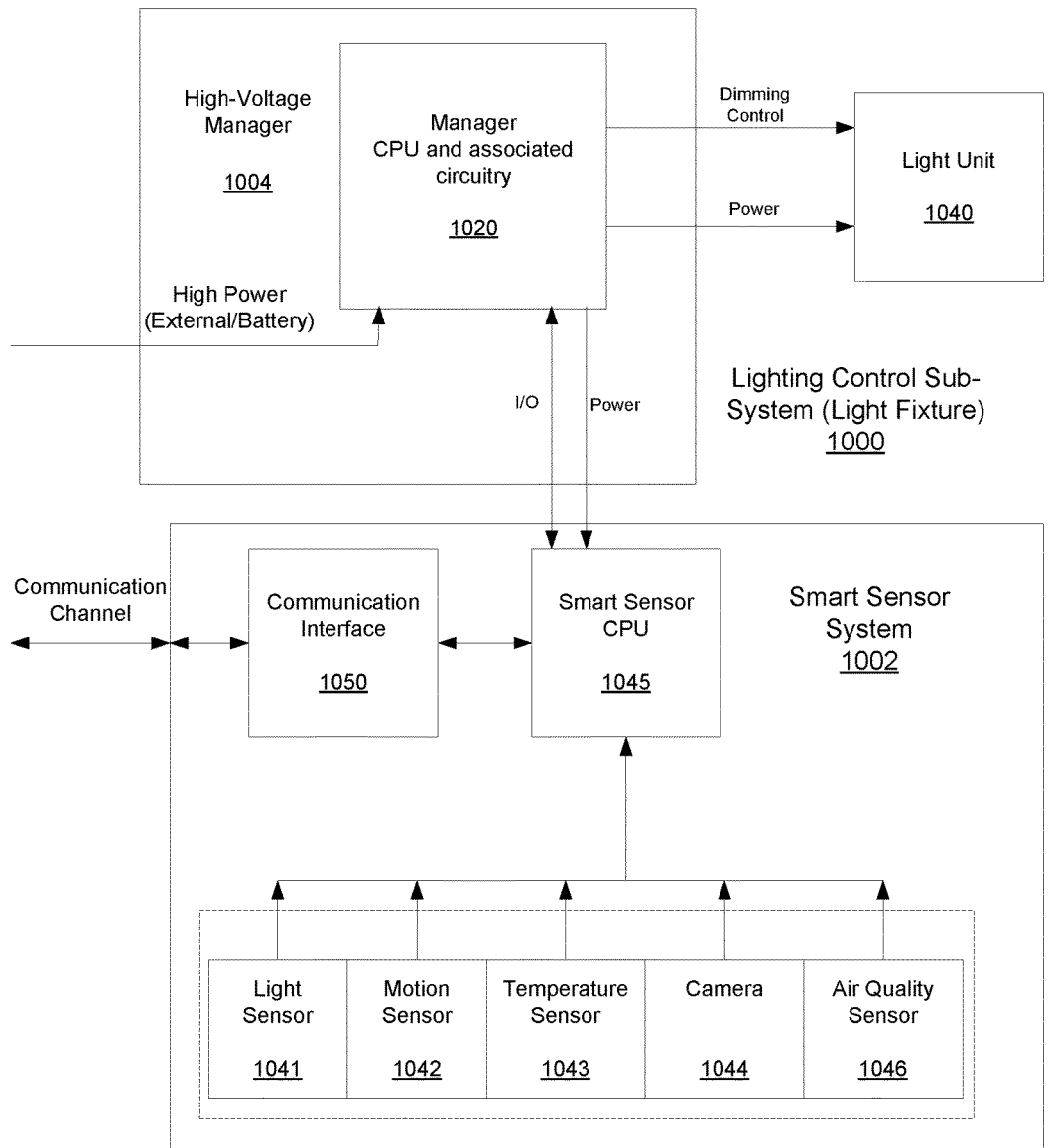
FIG. 10 shows an embodiment of an independently controllable light fixture.

FIG. 10 shows an embodiment of a light fixture 1000 that can be utilized as the fixture of the described embodiments. This embodiment of the light fixture 1000 includes a high-voltage manager 1004 and a smart sensor system 1002 that include a manager CPU 1020 and smart sensor CPU 1045 that operate in conjunction as a controller that independently manages and controls the operation of a lighting unit 1040. The light fixture 1000 can include any combination of sensors, such as, a light sensor 1041, a motion sensor 1042, a temperature sensor 1043, a camera 1044, and/or an air quality sensor 1046. The light fixture 1000 can receive profiles from elsewhere over a communications channel.

For the embodiment of FIG. 10, the high-voltage manager 1004 receives a high voltage (for example, 120 Volts) and generates a power supply voltage for both the smart sensor system 1002 (for example, 5 Volts) and the lighting unit 1040, and a dimming control for the lighting unit 1040. For this embodiment, both the high-voltage manager 1004 and the smart sensor system 1002 includes CPUs (central processing units) 1020 and 1045 which operate in conjunction to control the lighting unit 1040. While shown as separate controllers, it is to be understood that the operations and functionality of the two CPUs could be included within a single controller.

The previously described direct communication link can be established using any one or more of the sensors of the lighting fixture 1000. The light sensor 1041 and the motion sensor 1042 are likely candidates, but the possibilities are open. For example, some embodiments of camera sensors can be utilized as motion sensor, which can be used to establish the direct link. A user device establishes the direct communication link with the lighting fixture 1000, for example, by pulsing a light which is received or sensed by the light sensor 1041. Alternatively, or additionally, the user device establishes the direct communication link with the lighting fixture 1000 through motion that is sensed by the motion sensor 1042.

As shown, the light fixture 1000 includes the light unit 1040. It is to be understood that the light unit 1040 could alternatively be external to the controller. For this embodiment, the controller (manager CPU 1020 and smart sensor CPU 1045) can include outputs to effect the light level changes. For example, the outputs can control relays to turn lights on and off, and control 0-10 V or PWM (pulse width modulation) outputs for dimming. The controller 1020 can include a standard chipset that integrates a microprocessor unit, and interface for communicating different program instructions, and several ports for communicating with electronic devices.

The light fixture 1000 additionally includes an interface 1050 that allows the lighting fixture to communicate with the central controller through the second communications link. The interface 1050 can be a wired (for example Ethernet®), or the interface can be wireless (for example, Zigbee®). The interface 1050 can provide a direct link to the central controller, or the interface can provide an intermediate link to an intermediate device (such as the previously described gateway).

While the lighting fixture 1000 provides lighting control, it is to be understood the equivalent fixtures for controlling other environmental parameters, such as, light, temperature, and humidity can additionally or alternatively be implemented according to the described embodiments. Accordingly, the control information can include at least one of light intensity, lighting scenes, thermostat, and/or a security alarm.

For embodiments, the second communication link comprises at least one of a cellular link to a service provider wherein the central controller is connected to the service provider, or an 802.11 wireless link between the user device and the central controller.

Figure 11:
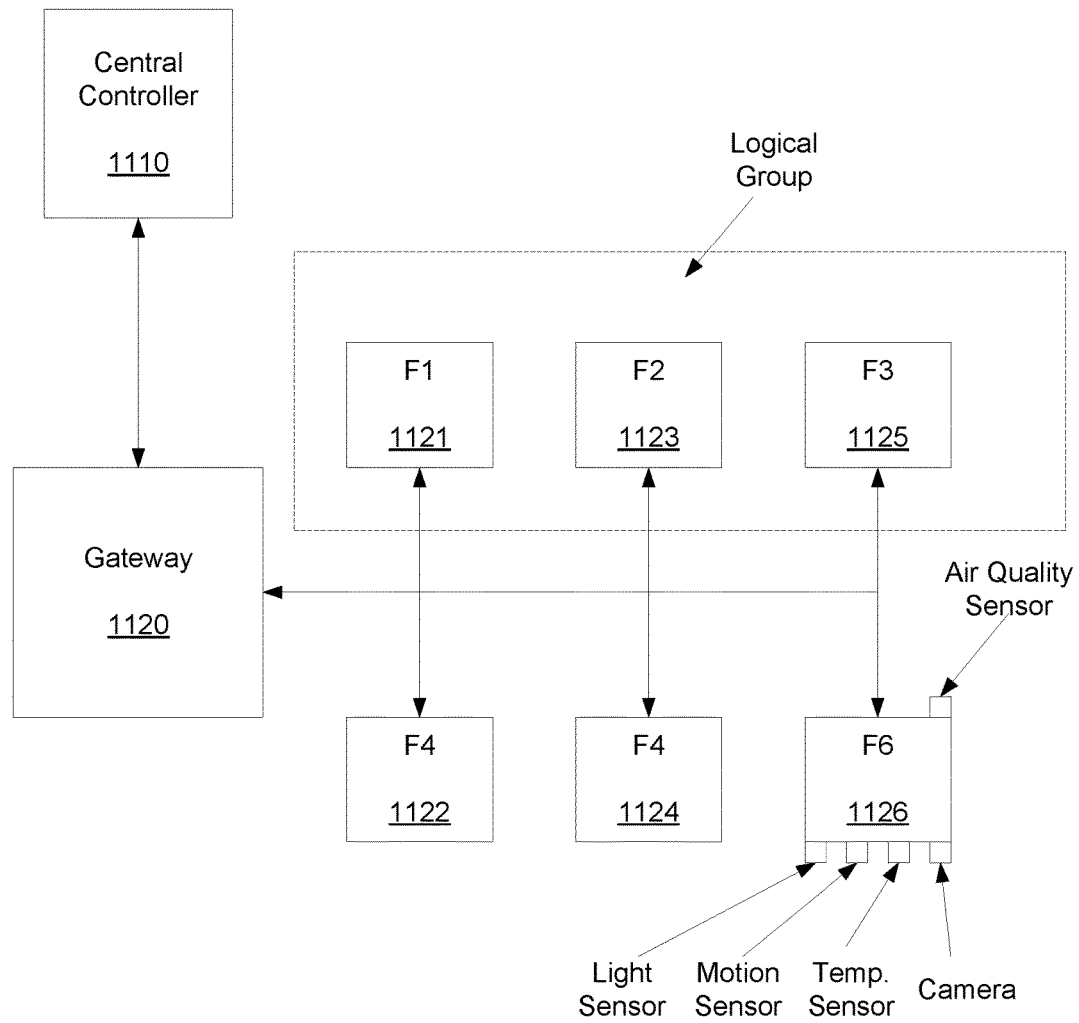
FIG. 11 shows an example of a plurality of independently controlled lights interfaced with a central controller.

FIG. 11 shows an example of a plurality of fixtures 1121, 1122, 1123, 1124, 1125, 1126 that are interfaced with a central controller 1110. For this embodiment, a gateway 1120 is included within a communications path (second communication link) between the central controller 1110 and the plurality of fixtures 1121, 1122, 1123, 1124, 1125, 1126. The central controller 1110 can initially provide each of the plurality of fixtures 1121, 1122, 1123, 1124, 1125, 1126 with a light profile.

As shown, the independently controlled lights can include any number of sensors. The sensors can include, for example, a light sensor, a motion sensor, a temperature sensor, a camera, and/or an air quality sensor. Information obtained from the sensors can be used directly by the independently controlled light itself, or at least some of the information can be fed back to the central controller 1110.

As shown, a plurality of the fixtures (such as, fixtures 1121, 1123, 1125) can be included within a logical group. A user device can establish a direct communication link with any one of the fixtures. If the fixture is within a logical group, the user device can then control fixtures within the logical group by sending control information to the central controller 1110 through the previously described second communications link. The controller can then control the fixtures of the logical group through communications through the first communications link.

Various embodiments include logical groups of fixtures that map onto, for example, a large conference room or a presentation hall. A user's direct communication link with any one of the fixtures within the conference room or presentation hall provides the user with access to a logical switch capable of controlling the entire space with preset scenes etc. That is, by accessing the logical switch through a direct link to any one of the fixtures of the logical group, the user can control the logical group. For an embodiment, the logical switch is configured by software operating on the fixtures and/or the central controller. The control of the logical switch offered to the user includes selection of an intensity of light of the logical group, and/or the selection of predetermined scenes associated with the logical group.

Another embodiment includes a method of providing user control of an environmental parameter of a structure. The method includes establishing a direct communication link between a user device and a fixture located within the structure, the fixture identifying itself by a first communication link to the user device, the user device using this identification to send control information to the fixture using the first communication link. This embodiment includes proximity based authorization.

Another embodiment includes method of providing user control of an environmental parameter of a structure. The method includes a user requesting control of one or more fixtures located within the structure, a central controller (backend server) receiving the user request (through a cellular or WiFi connection), accessing an electronic calendar (located at the central controller or remotely) to locate the fixture according to the electronic calendar, and providing the user with control information associated with the fixture, and the user selecting a control option for the fixture settings, and communicating selected control option back to selected fixture.

Although specific embodiments have been described and illustrated, the described embodiments are not to be limited to the specific forms or arrangements of parts so described and illustrated. The embodiments are limited only by the appended claims.

The invention claimed is:

1. A method of a lighting system providing user control of a structure, comprising:
    configuring one or more sensor units of the lighting system;
    establishing a local communication link between a user device and at least one sensor unit of the one or more sensor units;
    receiving, by the at least one sensor unit, a request from the user device through the local communication link;
    responding, by the at least one sensor unit, to the request by transmitting over a second link, an RF (radio frequency) self-identification signal, wherein the RF self-identification signal provides the user device with a display of control options;
    receiving, by the user device, select control options from a user of the user device based on the display of control options;
    transmitting, by the user device, an RF control signal that includes the select control options to the at least one sensor unit;
    the at least one sensor unit propagating the select control options to one or more controllers of the lighting system;
    the one or more controllers responding to the select control options with an operational change of a device associated with the at least one sensor unit; and
    the at least one sensor unit or the device associated with the at least one sensor unit providing an observable indicator to the user that the select control options have been addressed.

2. The method of claim 1, wherein configuring the one or more units of the lighting system comprising:
    setting an identification (ID) characteristic of the communication through local communication link between the user device and the at least one sensor unit in which the at least one sensor unit responds.

3. The method of claim 2, wherein configuring the one or more sensor units of the lighting system further comprises setting or defining operational changes of the device associated with the at least one sensor unit, and characteristics of the communication that correspond with the operational changes.

4. The method of claim 2, wherein setting the ID characteristics comprises defining a predetermined set of light pulses within the communication which cause the at least one sensor unit to respond to the communication.

5. The method of claim 1, wherein the select control options include at least one of a lighting level request, and an environmental control request.

6. The method of claim 1, wherein the at least one sensor unit propagating the select control options to the one or more controllers comprises the at least one sensor unit communicating the select control options to the one or more controllers through one or more communication links.

7. The method of claim 6, wherein the one or more communication links comprises a plurality of wireless links between the at least one sensor unit and at least one other sensor unit.

8. The method of claim 1, wherein the user device is not required to login or be authenticated by the one or more controllers of the lighting system.

9. The method of claim 1, further comprising the one or more controllers authenticating the user device through the second link.

10. The method of claim 9, further comprising the user device accessing the one or more controllers through the aid of a downloaded application.

11. The method of claim 9, further comprising the user device uploading personal preferences to the one or more controllers through the second link.

12. A system that provides user control of lighting of a structure, comprising:
a lighting fixture operative to establish a local communication link between a user device and the lighting fixture, wherein the lighting fixture is located within the structure;
one or more controllers operative to:
configure one or more sensor units of the lighting system, wherein at least one sensor unit of the one or more sensor units is associated with the lighting fixture;
wherein the at least one sensor unit is operative to receive a request from the user device, respond to the request by transmitting over a second link, an RF (radio frequency) self-identification signal, wherein the RF self-identification signal provides the user device with a display of control options, receive an RF control signal that includes select control options from the user device, wherein the select control options were input to the user device by a user on the display of control options, and propagate the select control options to the one or more controllers; wherein
the one or more controllers is further operative to respond to the select control options with an operational change of the lighting fixture associated with the at least one sensor unit; and
wherein the at least one sensor unit or the fixture associated with the at least one sensor unit is operative to provide an observable indicator to the user that the select control options have been addressed.

13. The system of claim 12, wherein configuring the one or more units of the lighting system comprising:
setting an identification (ID) characteristic of communication through communication link between the user device and the at least one sensor unit in which the at least one sensor unit responds.

14. The system of claim 12, wherein configuring the one or more units of the lighting system further comprises defining operational changes of the fixture associated with the at least one sensor unit, and characteristics of the communication that correspond with the operational changes.

15. The system of claim 12, wherein setting the ID characteristics comprises defining a predetermined set of light pulses within the communication which cause the at least one sensor unit to respond to the communication.

16. An intelligent lighting fixture, comprising:
a light;
a sensor unit, the sensor unit operative to receive stimulus from a mobile device through a local communication link;
a controller, wherein the controller or an external controller that is linked to the controller, is operative to:
configure one or more sensor units of the lighting system, wherein at least one of the one or more sensor units includes the sensor unit;
wherein the sensor unit is operative to receive a request from the user device, respond to the request by transmitting over a second link, an RF (radio frequency) self-identification signal, wherein the RF self-identification signal provides the user device with a display of control options, receive an RF control signal that includes select control options from the user device, wherein the select control options were input to the user device by a user on the display of control options, and propagate the select control options to the controller or the external controller; wherein
the controller or the external controller is further operative to respond to the select control options with an operational change of the lighting fixture associated with the sensor unit; and
wherein the sensor unit or the fixture associated with the sensor unit is operative to provide an observable indicator to the user that select control options have been addressed.

17. The intelligent lighting fixture of claim 16, wherein configuring the one or more units of the lighting system comprising:
setting an identification (ID) characteristic of communication through communication link between the user device and the sensor unit in which the at sensor unit responds.

18. The intelligent lighting fixture of claim 16, wherein configuring the one or more sensor units of the lighting system further comprises defining operational changes of the fixture associated with the sensor unit, and characteristics of the communication that correspond with the operational changes.

* * * * *